(12) United States Patent
Kondos

(10) Patent No.: US 7,784,474 B2
(45) Date of Patent: Aug. 31, 2010

(54) UNDERCARRIAGE WASHER

(76) Inventor: Stephen Kondos, 1240 Ridge Ave., Sharpsville, PA (US) 16150

( * ) Notice: Subject to any disclaimer, the term of this patent is extended or adjusted under 35 U.S.C. 154(b) by 275 days.

(21) Appl. No.: 11/831,350

(22) Filed: Jul. 31, 2007

(65) Prior Publication Data

US 2008/0029136 A1 Feb. 7, 2008

Related U.S. Application Data

(60) Provisional application No. 60/836,066, filed on Aug. 7, 2006.

(51) Int. Cl.
*B08B 3/00* (2006.01)
(52) U.S. Cl. .................... 134/123; 134/131
(58) Field of Classification Search ........... None
See application file for complete search history.

(56) References Cited

U.S. PATENT DOCUMENTS

| | | | |
|---|---|---|---|
| 4,580,726 A | 4/1986 | Unger | |
| 4,982,896 A | 1/1991 | Crow | |
| 4,984,746 A | 1/1991 | Joyal | |
| 5,707,014 A * | 1/1998 | Chan et al. | 239/754 |
| 5,769,324 A * | 6/1998 | Lenhart | 239/320 |
| 5,820,037 A | 10/1998 | Lawrence | |
| 6,045,064 A | 4/2000 | Abraham | |
| 6,079,640 A | 6/2000 | Merritts | |
| 6,247,658 B1 | 6/2001 | Bakas | |
| 6,962,313 B1 * | 11/2005 | Marks, Jr. | 248/200 |

OTHER PUBLICATIONS

Northern Tool & Equipment Catalog, Spring 2006.

* cited by examiner

*Primary Examiner*—Michael Barr
*Assistant Examiner*—Jason Y Ko
(74) *Attorney, Agent, or Firm*—James R. Williams

(57) ABSTRACT

The present invention describes an undercarriage washer including a stabilizing skid plate and an outlet that permits non-vertical fluid discharge. The washer is adapted for use with a high-pressure washing fluid. The undercarriage washer includes a rigid tube and an angled inlet and an outlet. A skid plate is fixedly secured to the tube proximate to the outlet. The skid plate provides sufficient lateral support so that a high-pressure discharge does not rotate the washer stream. A non-vertical discharge angle permits cleaning of large undercarriage parts.

20 Claims, 2 Drawing Sheets

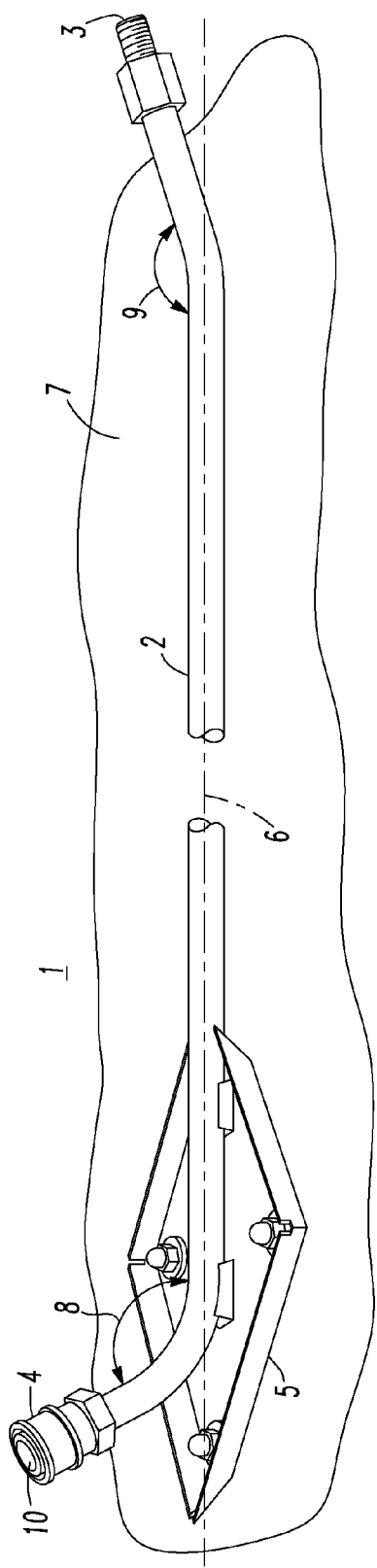
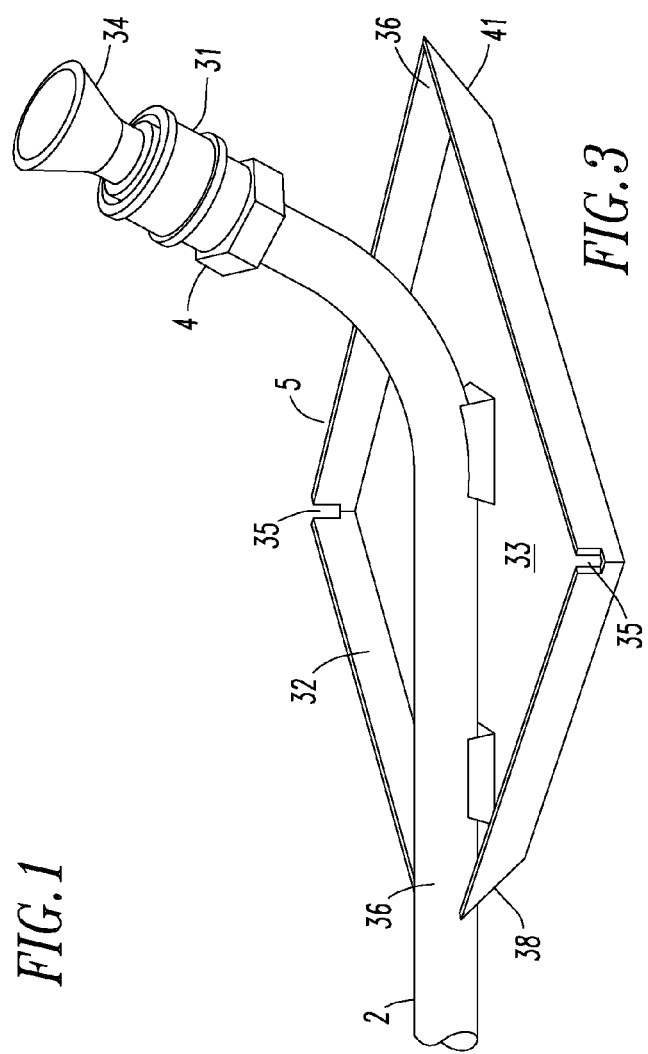

UNDERCARRIAGE WASHER

The present invention claims priority to U.S. provisional application No. 60/836,066.

FIELD OF THE INVENTION

The invention relates to a device that cleans accumulated deposits and debris from the undercarriage of vehicles or equipment, and more particularly to such a device that can be used with a high pressure washer and that can be used on a variety of surfaces.

BACKGROUND OF THE INVENTION

The undercarriage of vehicles and equipment can accumulate a significant amount of deposits and debris during normal use. Undercarriage includes but is not limited to the frame, wheel wells, underbody parts, and the underside of vehicles and equipment. Vehicles may include on- and off-road vehicles, such as cars, trucks, and all-terrain vehicles. Equipment can include, for example, construction equipment, farm implements, and lawn care machinery. Vehicles that are operated off-road or in regions of snow are especially vulnerable to accumulating deposits such as mud, ice and salt. Debris can include grass clippings and other organic detritus. Failure to remove these deposits and debris can cause rusting of or damage to the undercarriage and associated parts. General Motors, for example, recommends that the undercarriage and wheel well regions of its vehicles be cleaned periodically to prevent rust.

Prior art includes various attempts to clean undercarriages. U.S. Pat. No. 4,984,746 to Joyal discloses a device to remove such deposits and debris from an undercarriage. Joyal provides a T-shaped, three-wheeled base member having at least one upwardly facing steerable water nozzle. Means exits to receive a washing liquid and direct the washing liquid to the nozzle. A handle is fixedly attached to the base member and includes a means for orienting the nozzle. Similarly, U.S. Pat. No. 4,580,726 to Unger discloses a car under-washing device that, like Joyal, mounts upward facing water jets on a base member that can be wheeled under a vehicle. The jets are mounted on a T-shaped tube within the base member, which generally resembles a flat vacuum cleaner head. The devices of both Joyal and Unger are large, cumbersome, and directing a stream from either device into a confined space, such as a wheel well, would be difficult. The operator has no clear view of the orientation of the nozzles. A nozzle can freeze in position during icing conditions or with successive layers of deposits or debris falling on it. Both devices are too large to tip over easily, thereby making cleaning difficult. Finally, a heavy wheeled apparatus cannot be easily pushed back and forth through mud, snow or other soft surface.

U.S. Pat. No. 6,079,640 to Merritts teaches an undercarriage washer that includes a bent tube defining an inlet for a washing fluid that is fluidly connected to a plurality of orifices. Merrits' device eliminates the cumbersome bases of Joyal and Unger. Unfortunately, an operator must bear the entire weight of the device and the force of the water jets emanating from the orifices. The latter limits the pressure of the water jets because an operator must resist the force developed by multiple high pressure jets. Practically, multiple water jets are undesirable. Each water jet reduces the pressure of the jets and, therefore, their cleaning power. The back-and-forth motion of cleaning can even allow the water jet nearest the handle to squirt water into the air and perhaps onto the user.

U.S. Pat. No. 4,982,896 to Crow discloses a spray wand adapted to be connected to a garden hose. A fluid enters the wand and is directed to a nozzle. The nozzle includes a slit having a box-like passage and hemispherical walls that form the effluent into an elongated ribbon. The ribbon effluent is described as having greater cleaning capacity than a simple uniaxially symmetric stream. Negatively, the wand provides no apparent way to clean an undercarriage except for the operator to get on the ground a spray upwards towards the undercarriage. The pressure developed by the nozzle is limited by the incoming pressure of a simple garden hose.

U.S. Pat. No. 5,820,037 to Lawrence teaches an undercarriage washer having an inverted bowl-shaped element defining a nozzle directed substantially vertically. Water from a standard garden hose is fed into the element so that water sprays vertically from the nozzle. The element is supported by a wheel. The device of Lawrence has significant shortcomings. First, a vertical cleaning stream is not effective for large undercarriage parts, such as axles or springs. The vertical stream fails to impinge on the top surface of such large parts. Second, during cleaning, the copious quantities of water are used that end up below the undercarriage. Unless cleaning is performed on a water-impervious surface, such as concrete or asphalt, water will soften or muddy the surface. Pushing a wheel through such a soft surface is difficult. U.S. Pat. No. 6,247,658 to Bakas is similar to Lawrence but preferably includes two wheels. The problem of pushing wheels through mud or snow persists. Baker identifies a slit-like opening that may be rotated about a vertical axis, but no provision exists for altering the nozzle type or angle with respect to the vertical.

U.S. Pat. No. 6,045,064 to Abraham teaches an undercarriage washer comprising a rigid tube having an elbow conduit with a nozzle. A single wheel is mounted to the rigid tube adjacent to the elbow conduit. A garden hose may be connected to one end of the rigid tube. In use, the Abraham washer may be rolled back-and-forth. It still suffers from the problems associated with wheels; however, the position of the wheel permits the nozzle to be directed at angles other than vertically. Such non-vertical angles allow cleaning of larger undercarriage parts. The nozzle, like a common garden hose nozzle, may be adjusted to change the spray pattern.

A need exists for an undercarriage washer that controllably discharges a high-pressure cleaning fluid and can be maneuvered on all surfaces. Advantageously, switching nozzles would alter the spray pattern, and detergents and degreasers could be injected into the cleaning fluid.

SUMMARY OF THE INVENTION

The present invention describes an undercarriage washer including a stabilizing skid plate and an outlet that permits non-vertical fluid discharge. The washer is adapted for use with a high-pressure washing fluid. Unlike wheeled supports, the skid plate can be used on muddy or snowy surfaces, and provides sufficient lateral support so that a high-pressure discharge does not rotate the washer stream, thereby enabling an operator to retain control of the stream. The non-vertical discharge angle permits cleaning of large undercarriage parts.

The undercarriage washer includes a rigid tube having a longitudinal axis. The tube includes an inlet end and an outlet end that form obtuse angles with the axis. A skid plate is fixedly secured to the tube proximate to the outlet. The outlet accepts a nozzle and may include a quick connector that permits easy change of the nozzle and the resultant spray pattern.

The skid plate comprises a flattened plate and upturned edges. The skid plate may be of any convenient shape. Preferably, the skid plate is a parallelogram with two corners aligned along the longitudinal axis of the rigid tube. The corners and unturned ends permit the skid plate to glide over or cut through mud and snow. The skid plate may include a replaceable, sacrificial wear component.

BRIEF DESCRIPTION OF THE DRAWINGS

FIG. 1 is a side view of the undercarriage washer of the present invention.

FIG. 3 is a perspective view of the outlet end of the undercarriage washer.

DETAILED DESCRIPTION OF THE INVENTION

Figure 2:
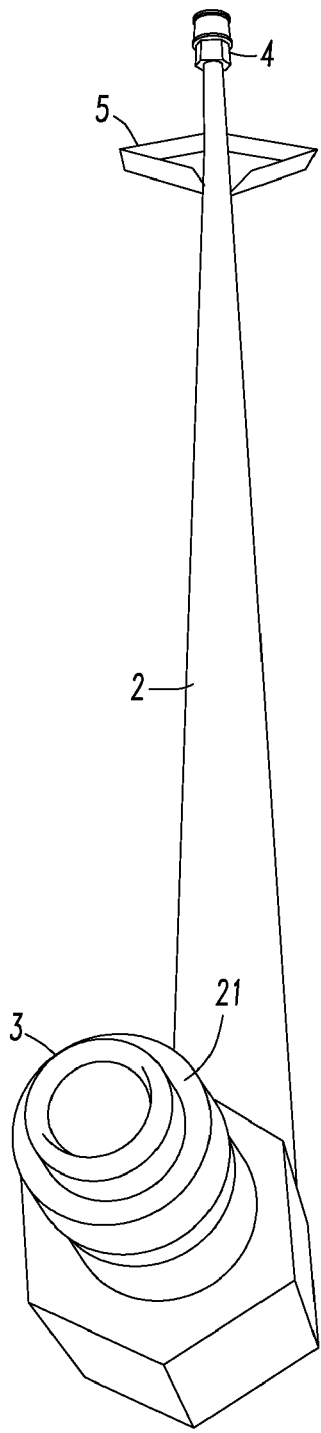
FIG. 2 is a rear view of the undercarriage washer along the longitudinal axis.

FIG. 1 shows an undercarriage washer 1 of the present invention. The undercarriage washer 1 includes a rigid tube 2, an inlet end 3, an outlet end 4, and a skid plate 5. The rigid tube 2 defines a longitudinal axis 6. In operation the longitudinal axis 6 will be substantially parallel to the ground 7. The inlet end 3 may include an inlet that is adapted to receive a high pressure hose (not shown). The outlet end 4 may define an outlet 10 that is adapted to receive a nozzle.

The rigid tube 2 should be of a length sufficient to reach the undercarriage. The length will typically be from 0.8-1.6 meters for smaller vehicles and equipment, such as automobiles and personal recreational vehicles. The length may be longer for larger vehicles and equipment such as, for example, trucks and farm implements. The rigid tube 2 may comprise any convenient material including metal or plastic. The material must be able to contain fluids at high pressure and should resist corrosion and fracture caused by rough handling. Preferably, the tube consists essentially of steel. The cleaning fluid will be supplied by a high pressure washer. Typical high pressure washers produce a stream of fluid above about 1000 psi through an opening of at least about one-quarter inch. The tube should have interior dimensions that do not substantially restrict the flow of the high pressure fluid, which may include water, detergents, degreasers, or combinations thereof. To this end, the interior dimensions of the tube should not introduce significant turbulence in the fluid or include significant obstructions. Conveniently, the interior dimensions may conform to that of the high pressure hose to which it is attached.

The inlet end 3 is oriented at an inlet angle 9 from the longitudinal axis 6 of the rigid tube 2. The inlet angle 9 may be selected for operator convenience so that an operator can comfortably stand while using the undercarriage washer 1. In use, the longitudinal axis 6 would normally be substantially parallel to the ground so that the inlet angle 9 will typically be from 125-145 degrees. As shown in FIG. 2, the inlet end 3 may include an inlet connector 21 that is adapted to connect with a high pressure washer.

The outlet end 4 is oriented at an outlet angle 8 from the longitudinal axis 6 of the rigid tube 2. The outlet angle 8 should permit the cleaning of large undercarriage parts. The inventor has determined that, although an orthogonal angle may be used, a non-orthogonal angle is preferred. The outlet angle 8 should be sufficiently vertical to direct the stream up into an undercarriage, but not so vertical that the directed stream could not reach the tops of large undercarriage parts. To this end, the outlet angle 8 should be at least about 90 degrees and up to about 135 degrees. Preferably, the outlet angle 8 is from 100-115 degrees. As shown in FIG. 3, the outlet end 4 may include an outlet connector 31 that is adapted to connect with a nozzle 34. Both inlet and outlet connectors may be of the quick connect variety, thereby facilitating attachment and removal of the high pressure hose and nozzles. Nozzles for high pressure washers care widely available and include wide and narrow angle spray patterns. A quick outlet connector permits selection of the most appropriate nozzle for any given job.

The skid plate 5 is fixedly secured to the rigid tube 2 proximate to the outlet end 4. The skid plate 5 should not rotate freely around the rigid tube 2. The skid plate may be secured by any means, such as bolts, straps, tabs, etc. Conveniently, the skid plate 5 is welded to the rigid tube 2 or cast as a single unit with the rigid tube. The proximity of the skid plate 5 to the outlet end 4 is determined by the necessary maneuverability of the undercarriage washer 1. During use, an operator may lift or tilt the rigid tube 2 using the skid plate 5 as a fulcrum. At least a portion of the skid plate 5 should remain resting on the ground 7 for reasons described below. Lifting or tilting redirects the exiting stream of cleaning fluid to a different location. Obviously, greater maneuverability exists when the skid plate 5 is closer to the outlet end 4. The precise location of the skid plate 5 relative to the outlet end 4 is easily determined by one skilled in the art depending on the particular use.

The skid plate 5 may be of any convenient shape and, as shown in FIG. 3, includes a flattened base 33 and an upturned edge 32. The flattened base 33 should be wide enough to prevent rotation effected by the force of high pressure washing fluid exiting from the outlet end 4. The inventor has found that a base having only point contact, e.g., a single wheel, will rotate in response to the torque generated by a high pressure effluent. An operator must actively resist rotation or lose control of the washer. In contrast, so long as the skid plate 5 contacts the ground 7, the operator need exert no such effort.

The skid plate will often include front, center and rear sections. Preferably, the front and rear section will be narrow and the center section will extend from the longitudinal axis as a plurality of stabilizing wings 43. The stabilizing wings 43 will be at least about 4 cm on either side of the longitudinal axis. The front section 41 of the skid plate 5 will be proximate to the outlet end 4. As shown in FIG. 3, the front section 41 is substantially beneath the outlet connector 31. Other locations for the skid plate 5 are possible depending on particular requirements. The rear section 38 of the skid plate 5 will be farthest from the outlet connector 31. The skid plate 5 may be of any convenient shape and may include oval or quadrilateral shapes, such as parallelograms.

An upturned edge 32 prevents the flattened base 33 of the skid plate 5 from cutting into soft surfaces. The upturned edge 32 should be at least about one-half centimeter high and is preferably at least about two centimeters high. The upturned edge 32 may circumscribe all or a portion of the flattened base 33. The upturned edge 32 may be present at the front section 41 and also at the rear section 38 so that the device does not plow into the ground surface when moved either forward or backward. An upturned edge that forms an obtuse angle with the flattened base 33 is preferred. The obtuse angle permits the device to plow through wet grass, snow, ice, mud, or other potentially restricting surfaces.

Figure 4:
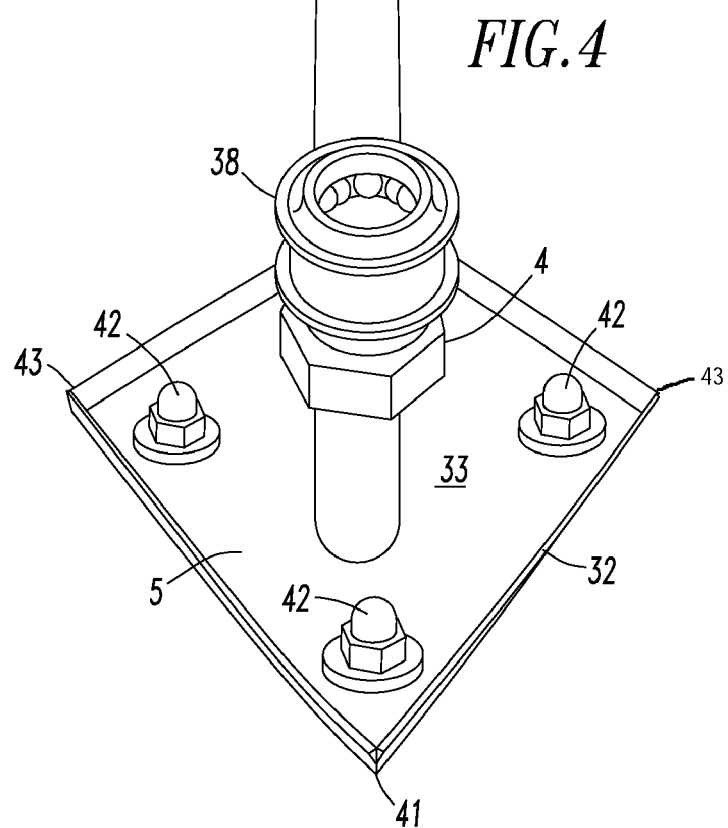
FIG. 4 is a front view of the undercarriage washer along the longitudinal axis.

FIG. 4 shows a skid plate 5 having a flattened base 33 comprising a parallelogram with an upturned edge 32 extending around a perimeter of the flattened base 33. The upturned edge 32 and the front section 41 form a front prow. The upturned edge 32 and the rear section 38 may form a rear prow. The rear prow may include the rigid tube 2. The prows at the front section 41 and rear section 38 permit the skid plate 5 to plough through soft surfaces, such as mud, snow, slush and grass. The skid plate 5 includes a center section comprising two stabilizing wings 43. In this embodiment, the stabilizing wings 43 include two vertices 35 of a parallelogram. The two other vertices 36 of the parallelogram are along the longitudinal axis 6 of the rigid tube 2. The two stabilizing wings 43 resist rotational forces when a high pressure stream exits the outlet end 4.

Optionally, the skid plate 5 may include a wear component 42 that will wear before the skid plate 5. The wear component 42 may include bolts, plates and appliqués, and may be secured to the skid plate 5 by any convenient method, including glue, threads, snaps, or spot welds. As shown in FIG. 4, the wear components 42 are a set of three bolts secured to the skid plate with screws. When used on hard surfaces, such as concrete, the bolts wear sacrificially before the skid plate 5. The wear components 42 can be replaced, thereby extending the life of the skid plate 5. Alternatively, the wear component includes a plastic plate that snaps to the skid plate.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed:

1. An undercarriage washer for use with a high pressure cleaning fluid having elements consisting of:
   a) a rigid tube having a longitudinal axis, an inlet end at a rear of the rigid tube, an outlet end at a front of the tube, the inlet end including an inlet, and the outlet end including an outlet; and
   b) a skid plate fixedly secured to the rigid tube proximate to the outlet end, the skid plate comprising a flattened base including a plurality of stabilizing wings, and an upturned edge extending at least around a portion of the flattened base, the skid plate being the first element to contact ground when the undercarriage washer is in use.

2. The undercarriage washer of claim 1, wherein the inlet is adapted to receive a high pressure hose.

3. The undercarriage washer of claim 1, wherein the outlet includes a nozzle.

4. The undercarriage washer of claim 1, wherein the longitudinal axis of the rigid tube and the inlet end define an inlet angle from 125 to 145 degrees.

5. The undercarriage washer of claim 1, wherein the longitudinal axis of the rigid tube and the outlet end define an outlet angle from 90 to 135 degrees.

6. The undercarriage washer of claim 1, wherein the stabilizing wings extend at least about 4 cm from the longitudinal axis.

7. The undercarriage washer of claim 1, wherein the flattened base includes front, rear and center sections, and the front section and upturned edge form a prow.

8. The undercarriage washer of claim 1, wherein the flattened base includes front, rear and center sections, and the rear section and the upturned edge form a prow.

9. The undercarriage washer of claim 1, wherein the flattened base includes front, rear and center sections and the center section includes the stabilizing wings.

10. The undercarriage washer of claim 1, wherein the flattened base includes a center section extending from the longitudinal axis of the rigid tube to form a stabilizing wing.

11. The undercarriage washer of claim 1, wherein upturned edge is at least about 0.5 cm high.

12. The undercarriage washer of claim 1, wherein the flattened base and the upturned edge define an obtuse angle.

13. The undercarriage washer of claim 1, wherein the skid plate includes a wear component.

14. The undercarriage washer of claim 13, wherein the wear component is selected from a group consisting of bolts, plates and appliqués.

15. An undercarriage washer for use with a high pressure cleaning fluid having elements consisting of:
   a) a rigid tube having a longitudinal axis, an inlet end at a rear of the tube, an outlet end at a front of the tube, the inlet end including an inlet, and the outlet end including an outlet; and
   b) a skid plate fixedly secured to the rigid tube proximate to the outlet end, the skid plate comprising a flattened base and an upturned edge, the flattened base including front, rear and center sections, the front section and upturned edge forming a prow, the flattened base including a plurality of stabilizing wings extending from the center section, the skid plate being the first element to contact ground when the undercarriage washer is in use.

16. The undercarriage washer of claim 15, wherein the inlet end defines an inlet angle with the longitudinal axis of the rigid tube, and the inlet angle is from 125 to 145 degrees.

17. The undercarriage washer of claim 15, wherein the outlet end defines an outlet angle with the longitudinal axis of the rigid tube, and the outlet angle is from 90 to 135 degrees.

18. The undercarriage washer of claim 15, wherein the stabilizing wings extend from the center section of the skid plate at least about 4 cm from the longitudinal axis of the rigid tube.

19. The undercarriage washer of claim 15, wherein the rear section and the upturned edge form a prow.

20. An undercarriage washer for use with a high pressure cleaning fluid having elements consisting of:
   a) a rigid tube having a longitudinal axis, and comprising two ends defining a front and a rear;
   b) an inlet end at the rear of the rigid tube, the longitudinal axis and the inlet end defining an inlet angle from 125 to 145 degrees, the inlet end including an inlet adapted to receive a high pressure hose;
   c) an outlet end at the front of the rigid tube, the longitudinal axis and the outlet end defining an outlet angle from 90 to 135 degrees, and the outlet end including a nozzle defining an outlet; and
   d) a skid plate fixedly secured to the rigid tube and proximate to the outlet end, the skid plate comprising a flattened base and a front section proximate to the front of the rigid tube, the skid plate being the first element to contact ground when the undercarriage washer is in use;
   e) a plurality of stabilizing wings extending from the skid plate at least about 4 cm from the longitudinal axis of the rigid tube;
   f) an upturned edge extending from the front section of the skid plate at least about 0.5 cm above the skid plate, the upturned edge and the skid plate defining an obtuse angle.

* * * * *